(12) United States Patent
Peters et al.

(10) Patent No.: US 7,350,912 B2
(45) Date of Patent: Apr. 1, 2008

(54) METHOD FOR PRINTING A SUBSTRATE WITH INK DROPS, AND INK COMPOSITION

(75) Inventors: Theodorus Henricus Gerardus Maria Peters, Veghel (NL); Jacobus Henricus Diederen, Cuijk (NL)

(73) Assignee: Stork Digital Imaging B.V., Boxmeer (NL)

( * ) Notice: Subject to any disclaimer, the term of this patent is extended or adjusted under 35 U.S.C. 154(b) by 50 days.

(21) Appl. No.: 10/671,289

(22) Filed: Sep. 25, 2003

(65) Prior Publication Data

US 2004/0119783 A1 Jun. 24, 2004

(30) Foreign Application Priority Data

Sep. 27, 2002 (NL) .................................. 1021555

(51) Int. Cl.
*G01D 11/00* (2006.01)
*C09D 11/00* (2006.01)

(52) U.S. Cl. .................................. 347/100; 106/31.58
(58) Field of Classification Search ................ 347/100, 347/101, 105, 54; 106/31.58
See application file for complete search history.

(56) References Cited

U.S. PATENT DOCUMENTS

| | | | | |
|---|---|---|---|---|
| 4,021,252 A | * | 5/1977 | Banczak et al. | 106/31.42 |
| 5,211,747 A | * | 5/1993 | Breton et al. | 106/31.34 |
| 5,254,158 A | * | 10/1993 | Breton et al. | 106/31.58 |
| 5,614,008 A | * | 3/1997 | Escano et al. | 523/161 |
| 5,755,862 A | * | 5/1998 | Gregory et al. | 106/31.48 |
| 6,139,611 A | * | 10/2000 | Kovacs et al. | 106/31.27 |
| 7,052,534 B2 | * | 5/2006 | Taguchi | 106/31.27 |

FOREIGN PATENT DOCUMENTS

| | | |
|---|---|---|
| DE | 26 11 312 | 9/1977 |
| EP | 0 441 987 A2 | 8/1991 |
| EP | 1 152 017 A1 | 11/2001 |

* cited by examiner

*Primary Examiner*—Stephen Meier
*Assistant Examiner*—Geoffrey S. Mruk
(74) *Attorney, Agent, or Firm*—Hoffmann & Baron, LLP

(57) ABSTRACT

In a method for printing a substrate which is provided with a polymeric ink-receiving layer with ink drops according to the "drop-on-demand" principle, using an ink jet printing device, the printhead of which is provided with a piezo element for generating ink drops, the method comprising the steps of supplying the substrate, generating ink drops and depositing the generated ink drops on the substrate, the ink from which the ink drops are formed, has an ink composition which comprises a dye, water, a lower alcohol and humectant, the lower alcohol content thereof being 5-30% by weight.

11 Claims, No Drawings

METHOD FOR PRINTING A SUBSTRATE WITH INK DROPS, AND INK COMPOSITION

CROSS-REFERENCE TO RELATED APPLICATIONS

This application claims priority to Netherlands Patent Application No. NL 1021555, filed Sep. 27, 2002, the contents of which are incorporated herein by reference.

BACKGROUND OF THE INVENTION

1. Field of the Invention

The invention relates to a method for printing a substrate with ink drops according to the "drop-on-demand" principle, which substrate is provided with a polymeric ink-receiving layer, using an ink jet printing device, the printhead of which is provided with a piezo element for generating ink drops, the method comprising the steps of supplying the substrate, generating ink drops and depositing the generated ink drops on the substrate, wherein the ink from which the ink drops are formed, has an ink composition which comprises a dye, water, a lower alcohol and humectant.

2. Description of the Related Art

Ink jet printing devices having its printhead provided with a piezo element for generating ink drops, are generally known in the specialist field. The piezo element can electrically generate a shock wave in the printhead, resulting in the formation of a drop from the ink in the printhead. In this way, it is possible to generate ink drops whenever they are required for printing the substrate, a technique also known as drop-on-demand (DOD) in the specialist field. The present DOD technique, which uses piezo elements, is also known as the piezo-DOD technique. An alternative to piezo-DOD within the drop-on-demand technique is a printhead with heating elements which are used to spray drops as a result of a vapour bubble being formed directly behind the jet nozzle with the aid of electrically controlled heat pulses in the nozzle channel filled with ink, the vapour bubble being used to launch a drop of ink. This alternative technique is also known as thermal-DOD and gives a printed result of which the combination of image quality and reproducibility is inferior to the printing result of piezo-DOD. Moreover, the service life of the heating element used in thermal-DOD is lower compared to the piezo element used in piezo-DOD.

Apart from the above, a substrate which is provided with a continuous, polymeric ink-receiving layer is in itself generally known in the specialist field and is also known as "resin coated paper" (RC paper). A substrate of this type can be printed with a high image quality, good reproducibility and high colour stability and consistency. An important application is the printing technique known as "proofing". Examples of prints covered by the term proofing include colour guides, and catalogues or advertisements in which the colour reproduction has to be as accurate as possible, such as for example for furniture or clothing. Proofing therefore requires a high image quality, reproducibility and consistency/colour stability of the printed result. Conventional substrates of the microporous or open type are inadequate for use for proofing, since the printed result becomes discoloured too quickly, i.e. has a poor colour stability. This discoloration occurs, inter alia, on account of the fact that the structure has a large contact surface area with the surrounding atmosphere, via which chemical degradation of the dye occurs. Printed substrates with a polymeric ink-receiving layer do have a high colour stability, since the polymer swells as it receives the ink and binds the dye into the ink-receiving layer, and the ink-receiving layer has a much lower contact surface area with the surrounding atmosphere compared to microporous substrates.

For the above reasons, the combination of piezo-DOD with RC paper is advantageous, inter alia, for proofing printing, since good printed results can only be achieved currently by using more expensive techniques, such as offset techniques (in which a separate printing forme is required for each printed image) or "continuous ink jet" techniques (which require more expensive equipment than the drop-on-demand technique).

Piezo-DOD requires inks having a viscosity of at least 3 centipoise (cP), whereas for thermal-DOD a lower viscosity of ink can be used. In the case of piezo-DOD, the viscosity of the ink needs to be at least equal to this level, since a shock wave by which an ink drop is generated needs to be extinguished or damped by the mass of ink which remains in the printhead, before a next shock wave can be applied for generation of a next ink drop. The higher the viscosity of the ink, the more quickly it absorbs the shock wave. In known inks for piezo-DOD, this viscosity is generally achieved by the addition of so-called humectants to the ink composition. Additionally, humectants have the function of preventing the inks from drying out both during printing, especially at the nozzle of the printhead, as well as during storage of the inks. Humectants generally have high hydroscopic values. At the same time, humectants have a low vapour pressure, with the result that when substrates with a polymeric ink-receiving layer are used for printing by means of piezo-DOD, the ink drops applied are very slow to evaporate. This results in mixing effects on the paper, which have an adverse effect on the quality of the printing result. In addition, the printed substrate remains sticky for a long time after it has been printed. These adverse effects are, logically, further enhanced when the content of humectants is increased in order to achieve the viscosity required for piezo-DOD.

It is an object of the present invention to entirely or partially solve at least one of the above problems.

SUMMARY OF THE INVENTION

According to a first aspect, the invention relates to a method of the type described in the preamble in which the lower alcohol content in the ink composition is 5-30% by weight. Surprisingly, it has been found that an ink composition having a lower alcohol content of this range is suitable for printing substrates with a polymeric ink-receiving layer, so that the colour stability which is inherent to these substrates can be obtained and the viscosity of the ink is sufficient for piezo-DOD, while the stickiness of the printed substrate has decreased greatly. It is assumed that the relatively higher viscosity is due to a synergistic effect between the lower alcohol and water, probably caused by the formation of hydrogen bridges between water and the lower alcohol. It is in this way possible to reduce the humectant content in the composition, thereby increasing the drying rate of ink drops applied upon the substrate. An additional advantage relates to a relatively high content of lower alcohol, because this component has a high vapour pressure compared to the other components in the ink composition, and thereby further increases the drying rate of ink drops which have been applied. The lower alcohol content in the composition of the ink is advantageously 10-30% by weight, since in the range from 5-10% by weight the ink viscosity produced may be insufficient for the remaining ink in a printhead to absorb a shock wave sufficiently quickly after ink drops have been ejected. More preferably, the lower alcohol content is 10-25% by weight, in particular approximately 20% by weight. In piezo-DOD, the extent to which the ink needs to be viscous depends, inter alia, on the design of the printhead. The humectant: lower alcohol weight ratio in the ink composition is advantageously between 0.10 and 1.50, because a good balance in the ink properties is thus achieved with regard to the colour stability and resistance to drying out, on the one hand (by the humectant) and the drying rate, on the other hand (by the lower alcohol). In the present application, the term "lower alcohol" is to be understood as meaning alcohols having 1-5 carbon atoms which may be straight-chain or branched. Examples include alkanols and alkenols with one or more unsaturated bonds.

DETAILED DESCRIPTION OF THE INVENTION

The method according to the invention is preferably carried out with an ink composition in which the lower alcohol is selected from the group consisting of monohydric alcohols having 1-4 carbon atoms. This group of lower alcohols has a favourable combination of a viscosity-increasing effect and a high vapour pressure.

More preferably, the lower alcohol comprises isopropanol. Among the group of lower alcohols, isopropanol not only has a very suitable combination of a viscosity-increasing effect and a high vapour pressure, but also has a less unappealing smell for the user.

In a preferred embodiment of the method according to the invention, the humectant comprises one or more polyhydric alcohols, polyethylene glycols, or polypropylene glycols and/or glycol ethers. In combination with the lower alcohol, these types of humectants have been found to give good printed results for proofing purposes. In the present context, the term polyhydric alcohols is to be understood as meaning that the alcohols contain at least two alcohol groups. Examples of humectants include polyols, such as glycerol and 1,5-pentanediol, and various types of glycol, such as propylene glycol, dipropylene glycol, diethylene glycol and polyethylene glycol 200.

In a further preferred embodiment of the method according to the invention, the polyhydric alcohol: lower alcohol weight ratio is between 0.2 and 0.8, since this results in a further improvement of the balance of the properties of the ink with regard to the colour stability and the resistance to drying out, on the one hand (by the humectant, i.e. polyhydric alcohol), and the drying rate, on the other hand (by the lower alcohol).

It is preferable for the lower alcohol: water weight ratio to be between 0.08 and 0.6. A ratio of this range offers a sufficient synergistic effect with regard to the viscosity of the ink composition, which effect is associated with the combination of water and lower alcohol by the formation of hydrogen bridges.

In the method according to the invention, it is preferable to use a substrate which comprises a polymeric ink-receiving layer made from a swelling polymer. In this context, the term swelling polymer is to be understood as meaning a hydrophilic polymer which swells up when it comes into contact with water. Examples of swelling polymers include polyacrylates, polyvinyl alcohols, polyvinylpyrrolidones and combinations thereof. The substrate preferably comprises a paper layer, a polyethylene layer and an ink-receiving layer made from swelling polymer which is approximately 1-30 micrometers thick. The polyethylene layer is in this case applied onto both sides of the paper, and the ink-receiving layer is applied onto one or both sides of the paper.

The dye which is used in the ink composition for the method according to the invention is selected from the group consisting of common water-soluble dyes, preferably of the direct, acidic or reactive type, which are commercially available, such as for example Direct black 109, Acid yellow 23 and Reactive red 180.

In general, it is advantageous to add surface-active substances (surfactants), fungicides and bactericides to the ink composition. Surfactants have a beneficial effect on the wetting of the printhead, the control of drop formation and the acceleration of ink absorption by the substrate. Substances such as various types of alkylpolyethylene oxides, nonyl-phenyl-polyethylene oxides, silicones, etc., are normally used in the specialist field as surfactants. Bactericides have a favourable effect on the shelf life of the ink. Common bactericides can be used for this purpose, such as the products which are available under the trade names Proxel (produced by Avecia) and Nuosept (produced by Nuodex).

According to a second aspect, the invention relates to an ink composition which is particularly suitable for the method according to the invention, which comprises a dye, water, lower alcohol and humectant, the lower alcohol content thereof being 5-30% by weight. The advantages discussed above are achieved by using this ink composition on substrates with a polymeric ink-receiving layer.

The ink composition which is clearly intended for the method according to the invention preferably has a viscosity greater than 3 cP.

The invention will be explained hereafter with reference to the following examples of ink compositions for piezo-DOD.

EXAMPLE 1

| Constituent: | Percentage (wt.) |
| --- | --- |
| Water | 57.6 |
| PEG 200 | 20 |
| 2-pyrrolidone | 5 |
| Isopropanol | 15 |
| Reactive Red 180 | 2 |
| Proxel GXL | 0.2 |
| Tergitol 15-S-7 | 0.2 |
| Total | 100% |

EXAMPLE 2

| Constituent | Percentage (wt.) |
| --- | --- |
| Water | 57.6 |
| Dipropylene glycol | 15 |
| Glycerol | 5 |
| Isopropanol | 20 |
| Acid Yellow 23 | 2 |
| Triton GR-5M | 0.2 |
| Tergitol 15-S-7 | 0.2 |
| Total | 100% |

EXAMPLE 3

| Constituent | Percentage (wt.) |
| --- | --- |
| Water | 35.45 |
| Glycerol | 16.25 |
| Humectant | 2.25 |
| 2-pyrrolidone | 2.25 |
| Isopropanol | 21 |
| Fungicide | 0.1 |
| Direct Turkish Blue | 22.7 |
| Total | 100% |

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Method for printing a substrate with ink drops according to the "drop-on-demand" principle, which substrate is provided with a polymeric ink-receiving layer, using an ink jet printing device, the printhead of which is provided with a piezo element for generating ink drops, the method comprising the steps of supplying the substrate, generating ink drops and depositing the generated ink drops on the substrate, wherein the ink from which the ink drops are formed, has an ink composition which comprises a water-soluble dye, water, a lower alcohol and humectant, wherein the lower alcohol content is 5-30% by weight, wherein the ink composition has a viscosity greater than 3 cP, and wherein the humectant to lower alcohol weight ratio is between 0.10 and 1.50.

2. Method according to claim 1, wherein the lower alcohol is selected from the group consisting of monohydric alcohols having 1-4 carbon atoms.

3. Method according to claim 1, wherein the lower alcohol comprises isopropanol.

4. Method according to claim 1, wherein the humectants comprise one or more polyhydric alcohols, polyethylene glycols, or polypropylene glycols.

5. Method according to claim 1, wherein the lower alcohol to water weight ratio is between 0.08 and 0.6.

6. Method according to claim 5, wherein the substrate comprises a polymeric ink-receiving layer made from a swelling polymer.

7. Method according to claim 1, wherein the ink composition consists essentially of dye, water, lower alcohol and humectant.

8. Method according to claim 7, wherein the ink composition further comprises an additive selected from the group of surfactants, bactericides and fungicides.

9. Ink composition, particularly suitable for the method according to one of the preceding claims, wherein the ink composition comprises a water-soluble dye, water, lower alcohol and humectant, the lower alcohol content thereof being 5-30% by weight, the lower alcohol to water weight ratio being between 0.08 and 0.6, wherein the ink composition has a viscosity greater than 3 cP, and wherein the humectant to lower alcohol weight ratio is between 0.10 and 1.50.

10. The ink composition according to claim 9, wherein the ink composition consists essentially of dye, water, lower alcohol and humectant.

11. The ink composition according to claim 9, wherein the ink composition further comprises one or more additives selected from the group comprising surfactants, bactericides and fungicide.

* * * * *